United States Patent
Adimatyam et al.

(10) Patent No.: US 9,300,939 B2
(45) Date of Patent: Mar. 29, 2016

(54) METHODS AND SYSTEMS FOR RESOLVING CONFLICTS IN A MULTI-TUNER DIGITAL VIDEO RECORDING SYSTEM

(71) Applicant: Verizon Patent and Licensing Inc., Arlington, VA (US)

(72) Inventors: Venkata S. Adimatyam, Irving, TX (US); Tariq Roshan, Irving, TX (US); Sameer Gavade, Irving, TX (US); Anil R. Arrabole, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 539 days.

(21) Appl. No.: 13/691,493

(22) Filed: Nov. 30, 2012

(65) Prior Publication Data

US 2014/0153904 A1    Jun. 5, 2014

(51) Int. Cl.

| | |
|---|---|
| H04N 9/79 | (2006.01) |
| H04N 5/76 | (2006.01) |
| H04N 5/782 | (2006.01) |
| H04N 21/4147 | (2011.01) |
| H04N 21/433 | (2011.01) |
| H04N 21/458 | (2011.01) |
| H04N 21/426 | (2011.01) |
| H04N 21/438 | (2011.01) |
| H04N 21/472 | (2011.01) |
| H04N 5/765 | (2006.01) |
| H04N 21/436 | (2011.01) |

(52) U.S. Cl.
CPC . *H04N 9/79* (2013.01); *H04N 5/76* (2013.01); *H04N 5/782* (2013.01); *H04N 21/4147* (2013.01); *H04N 21/4263* (2013.01); *H04N 21/4334* (2013.01); *H04N 21/4383* (2013.01); *H04N 21/4583* (2013.01); *H04N 21/47214* (2013.01); *H04N 5/765* (2013.01); *H04N 21/43615* (2013.01)

(58) Field of Classification Search
CPC ........................................................ H04N 9/79
USPC ........................................................ 386/248
See application file for complete search history.

(56) References Cited

U.S. PATENT DOCUMENTS

| | | | |
|---|---|---|---|
| 2004/0156614 A1* | 8/2004 | Bumgardner et al. | 386/46 |
| 2008/0010518 A1* | 1/2008 | Jiang et al. | 714/21 |
| 2010/0169829 A1* | 7/2010 | Stallings et al. | 715/810 |
| 2012/0192234 A1* | 7/2012 | Britt et al. | 725/58 |

* cited by examiner

*Primary Examiner* — Thai Tran
*Assistant Examiner* — Nien-Ru Yang

(57) ABSTRACT

An exemplary method includes a conflict resolution system 1) detecting a request for a DVR system having a plurality of tuners to tune to a media content program at a time during which all of the tuners are tuned to other media content programs, 2) identifying one or more media content programs that are being presented by the DVR system at the time of the request and one or more media content programs that are only being recorded by the DVR system at the time of the request, 3) presenting a conflict resolution interface that includes one or more selectable entries representative of the identified one or more media content programs that are only being recorded by the DVR system, and 4) excluding the identified one or more media content programs that are being presented by the DVR system from being represented in the conflict resolution interface.

15 Claims, 11 Drawing Sheets

METHODS AND SYSTEMS FOR RESOLVING CONFLICTS IN A MULTI-TUNER DIGITAL VIDEO RECORDING SYSTEM

BACKGROUND INFORMATION

Digital video recording ("DVR") systems allow users to record media content and then view or otherwise experience the recorded media content. For example, a user may use a DVR system to schedule a recording of a particular television program, after which the DVR system may record the television program and allow the user to play back the recorded television program in a time-shifted manner.

Many DVR systems include multiple tuners, which allow these DVR systems to concurrently record and/or present multiple media content programs. For example, a multi-tuner DVR system may include multiple DVR devices (e.g., set-top box devices and/or receivers) distributed throughout a premises (e.g., a home) and communicatively coupled to each other in a manner that allows multiple users (e.g., family members) to watch and/or record different media content programs at the same time.

Because the number of tuners included in a multi-tuner DVR system is typically fixed, a conflict may arise if a user of the multi-tuner DVR system attempts to view and/or record a particular media content program when all of the tuners of the multi-tuner DVR system are already in use (i.e., being used to present and/or record other media content programs). Resolution of this conflict may involve directing the multi-tuner DVR system to reallocate one of the tuners that are in use to the particular media content program. Unfortunately, this may disrupt a viewing experience of another user of the multi-tuner DVR system who is watching a different media content program at the time of the attempt if the tuner being used to present the different media content program is selected for the reallocation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
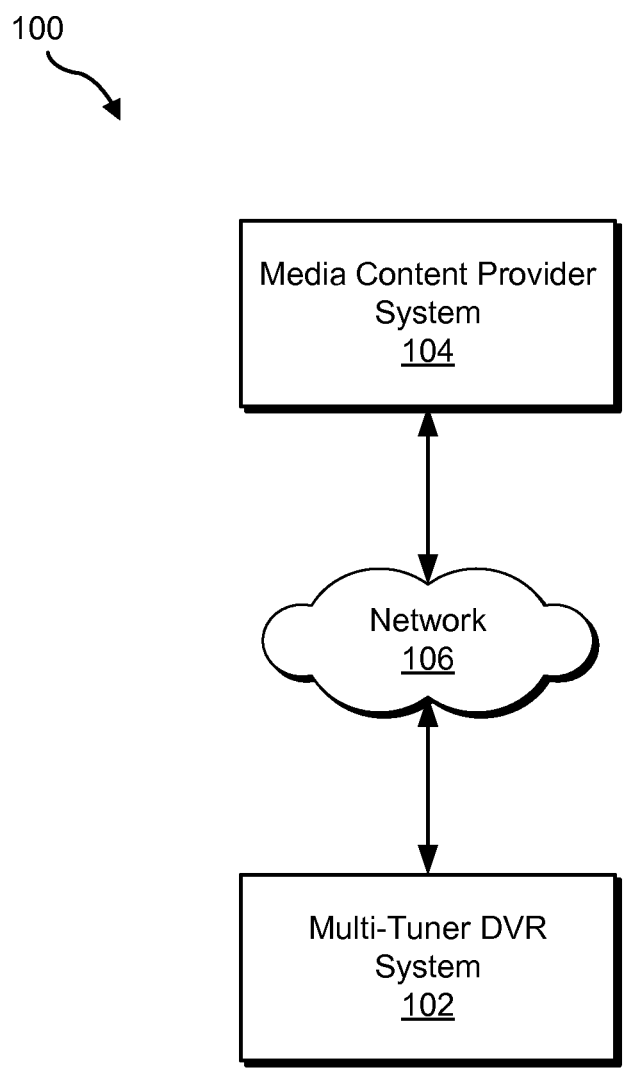
FIG. 1 illustrates an exemplary configuration in which a multi-tuner DVR system is communicatively coupled to a media content provider system according to principles described herein.

Methods and systems for resolving conflicts (i.e., tuner-related conflicts) in a multi-tuner DVR system are described herein. As will be described below, a conflict resolution system may 1) detect a request for a DVR system having a plurality of tuners (i.e., a multi-tuner DVR system) to tune to a media content program at a time during which all of the tuners are tuned to other media content programs, 2) identify, in response to the request, one or more media content programs included in the other media content programs and that are being presented by the DVR system at the time of the request and one or more media content programs included in the other media content programs and that are only being recorded by the DVR system at the time of the request, 3) present, in response to the identifying, a conflict resolution interface that includes one or more selectable entries representative of the identified one or more media content programs that are only being recorded by the DVR system at the time of the request, and 4) exclude the identified one or more media content programs that are being presented by the DVR system at the time of the request from being represented in the conflict resolution interface. A user may use the conflict resolution interface to cancel one of the one or more media content programs that are only being recorded by the DVR system at the time of the request (thereby freeing up one of the tuners) and direct the freed tuner to tune to the media content program of interest.

Various benefits may be realized in accordance with the methods and systems described herein. For example, by including only those media content programs that are only being recorded (and not presented) in the conflict resolution interface, the tuners that are tuned to media content programs being presented by the DVR system at the time of the request are excluded from a group of tuners that the DVR system may use to tune to the requested media content program. This ensures an uninterrupted viewing experience of users who are watching or otherwise experiencing media content programs by way of the DVR system at the time of the request. Moreover, this ensures that other users do not inadvertently experience (e.g., view) media content programs that they do not want to experience and/or that they are not permitted to experience. For example, a parent utilizing a DVR device in the living room of a home may provide a request to record a media content program that includes content not suitable for children. The methods and systems described herein may ensure that a tuner being used to present a different media content program to the parent's child in the child's bedroom is not used to tune to the media content program requested by the parent so that the media content program requested by the parent may be recorded. This may prevent the media content program requested by the parent from being inadvertently presented to the child.

As used herein, the terms "media content" and "media content program" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a multi-tuner DVR system.

FIG. 1 illustrates an exemplary configuration 100 in which a multi-tuner DVR system 102 (or simply "DVR system 102") is communicatively coupled to a media content provider system 104. As will be described below, various components of the conflict resolution system described herein may be implemented by DVR system 102 and/or media content provider system 104.

DVR system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and media content provider system 104 may communicate using any suitable network. For example, as shown in FIG. 1, DVR system 102 and media content provider system 104 may be configured to communicate with each other by way of network 106. Network 106 may include one or more networks or types of networks capable of carrying communications and/or data signals between DVR system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a service provider (e.g., a subscriber television service provider, an Internet service provider, a DVR service provider, etc.), a media content program provider (e.g., ESPN, NBC, etc.), and/or any other type of media content provider. Accordingly, media content provider system 104 may be configured to provide one or more media content services (e.g., DVR services, television services, video-on-demand services, Internet services, application services, etc.) to DVR system 102 and/or to users by way of DVR system 102. For example, media content provider system 104 may be configured to manage (e.g., maintain, process, distribute, and/or generate) media content (e.g., media content programs, advertisements, etc.) configured to be delivered to DVR system 102. Media content provider system 104 may be implemented by one or more computing devices as may serve a particular implementation.

DVR system 102 may facilitate access by one or more users to media content (e.g., media content programs) provided by media content provider system 104. For example, DVR system 102 may present and/or record (e.g., concurrently) multiple media content programs at the direction of one or more users. To this end, DVR system 102 may include a plurality of tuners. Each tuner may be configured to be tuned to a particular media content program at the direction of DVR system 102 and/or at the direction of a user of DVR system 102. This may be performed in any suitable manner. For example, a tuner may tune to a media content program by tuning to a media content channel carrying the media content program. Additionally or alternatively, a tuner may tune (e.g., switch) to a digital stream of data packets (e.g., Internet Protocol ("IP") based data packets) carrying the media content program. Hence, as used herein, a "tuner" may be implemented by one or more hardware components and/or one or more software components.

In some examples, the total number of tuners associated with DVR system 102 may be specified in accordance with a DVR service plan provided by a DVR service provider. For example, a family may subscribe to a DVR service in which the family is allocated a predetermined number of tuners (e.g. six tuners). The family may then utilize up to the predetermined number of tuners (e.g., by directing DVR system 102 to concurrently present and/or record up to six different media content programs). The DVR service may subsequently be updated to provide a different number of tuners to the family. For example, the family may upgrade their DVR service subscription to increase the predetermined number of tuners allocated to them.

Figure 2:
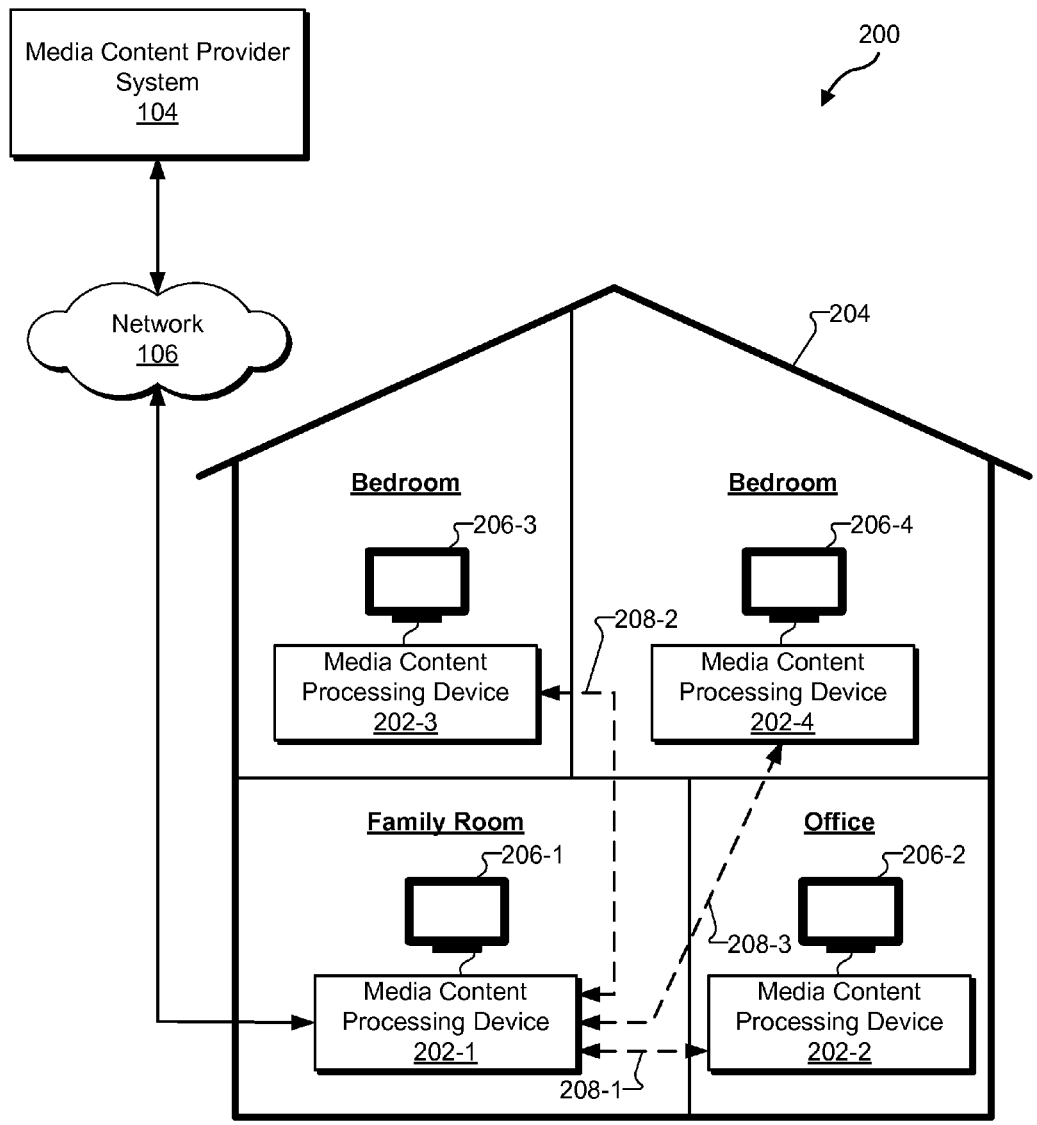
FIG. 2 shows an exemplary implementation of the DVR system of FIG. 1 according to principles described herein.

DVR system 102 may be implemented by any suitable combination of media content processing or computing devices ("processing devices"). For example, DVR system 102 may be implemented by one or more local processing devices (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). To illustrate, FIG. 2 shows an exemplary implementation 200 of DVR system 102 in which DVR system 102 is implemented by a plurality of media content processing devices 202 (e.g., media content processing devices 202-1 through 202-4) located within a particular premises 204 (e.g., a home). Each media content processing device 202 may be implemented by one or more of the local processing devices described herein. For example, each media content processing device may be implemented by a set-top box device having DVR capabilities.

As shown, media content processing devices 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As illustrated by dashed lines 208-1 through 208-3, each media content processing device 202 may be communicatively coupled one to another (e.g., by way of a local area network ("LAN")). In this configuration, media content processing devices 202 may share one or more tuners. For example, each media content processing device 202 may have one or more tuners associated therewith. Each of these tuners may be used by any one of the media content processing devices 202 to present and/or record media content. To illustrate, a tuner associated with (e.g., included within) media content processing device 202-1 may be used by media content processing device 202-3 to present and/or record media content. In some examples, the same tuner may be used to concurrently present media content by way of multiple media content processing devices 202. For example, users located within different rooms of premises 204 may concurrently watch the same media content program by way of different media content processing devices 202 (e.g., media content processing device 202-1 and media content processing device 202-2) utilizing the same tuner. Concurrent use of a single tuner by multiple media content processing devices 202 and/or users will be referred to herein as "tuner sharing."

One or more of media content processing devices 202 may be communicatively coupled to media content provider system 104 by way of network 106. For example, FIG. 2 shows that media content processing device 202-1 is communicatively coupled to media content provider system 104 by way of network 106. In this configuration, media content processing device 202-1 may serve as a gateway through which media content is provided to the other media content processing devices 202-2 through 202-4. It will be recognized that any or all of the other media content processing devices 202-2 through 202-4 may additionally or alternatively be directly connected to media content provider system 104 by way of network 106.

Figure 3:
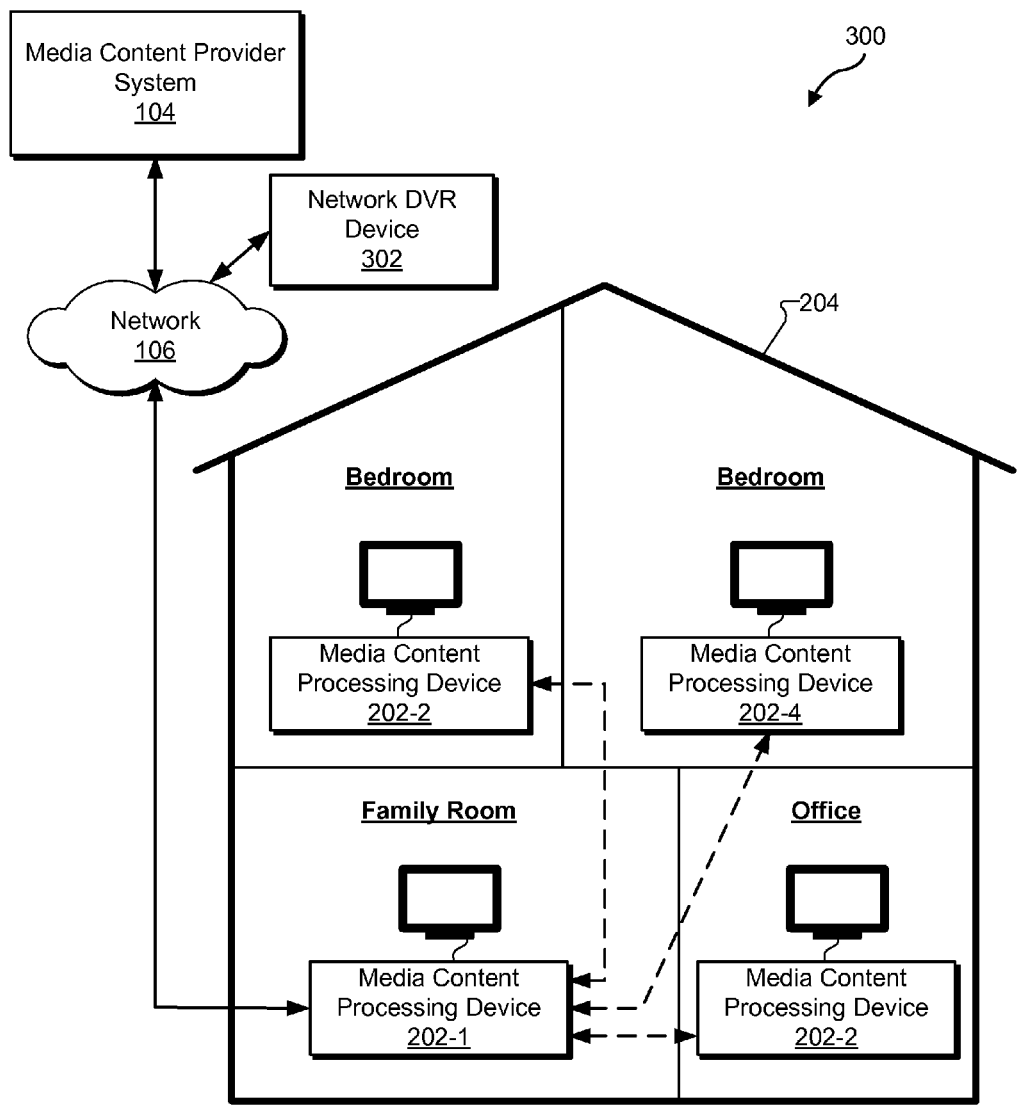
FIG. 3 shows another exemplary implementation of the DVR system of FIG. 1 according to principles described herein.

DVR system 104 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with media content processing devices 202 and media content provider system 104 by way of network 106. In this implementation, network DVR device 302 may perform one or more DVR operations traditionally performed by local DVR devices. For example, network DVR device 302 may record and/or store media content programs, stream media content programs to media content processing devices 202, and/or perform any other DVR operation as may serve a particular implementation. Each media content processing device 202 may be configured to interface with network DVR device 302 such that one or more users located within premises 204 may direct network DVR device 302 to perform one or more DVR operations.

Network DVR device 302 may have a plurality of tuners associated therewith. In some examples, a subset of these tuners may be associated with a particular DVR services subscription maintained by one or more users. For example, a predetermined number of tuners (e.g., four tuners) associated with network DVR device 302 may be allocated to a particular family residing within premises 204 in accordance with a DVR services subscription maintained by the family.

In some examples, network DVR device 302 may be associated with and/or maintained by a media content provider and/or a service provider associated with media content provider system 104. For example, network DVR device 302 may be located at a premises maintained by a subscriber television network provider.

Figure 4:
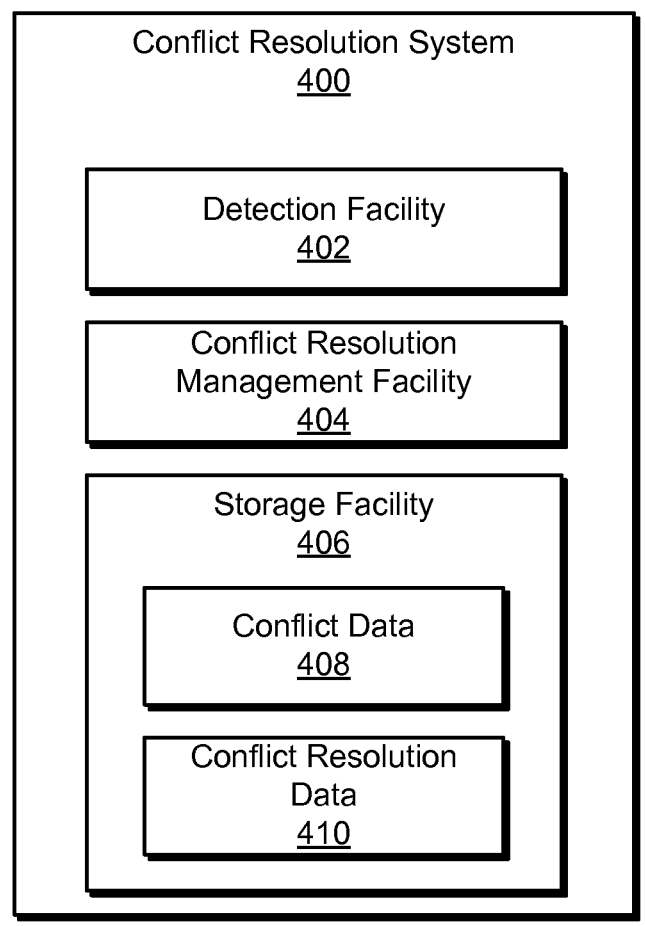
FIG. 4 illustrates an exemplary conflict resolution system according to principles described herein.

FIG. 4 illustrates an exemplary conflict resolution system 400 ("system 400") that may be used to resolve conflicts (i.e., tuner-related conflicts) that may arise in DVR system 102. System 400 may be implemented by DVR system 102, media content provider system 104, media content processing devices 202, and/or any other combination of computing devices.

As shown, system 400 may include a detection facility 402, a conflict resolution management facility 404, and a storage facility 406 selectively and communicatively coupled to one another. It will be recognized that although facilities 402-406 are shown to be separate facilities in FIG. 4, any of facilities 402-406 may be combined into fewer facilities, such as into a single facility, or divided into more facilities as may serve a particular implementation.

Detection facility 402 may be configured to detect a conflict (e.g., a tuner-related conflict) associated with a DVR system having a plurality of tuners (e.g., DVR system 102). This may be performed in any suitable manner. For example, detection facility 402 may detect a conflict by detecting a request for the DVR system to tune to a media content program at a time during which all of the tuners of the DVR system are already tuned to other media content programs.

In some examples, the request for the DVR system to tune to the media content program may be provided by a user of the DVR system. For example, a user may provide input representative of a request to experience (e.g., view) a particular media content program (e.g., by selecting the media content program from an electronic program guide, changing a media content channel, and/or in any other suitable manner), access video-on-demand content, record a particular media content program, record content being carried by way of a particular media content channel, and/or otherwise access media content programs by way of the DVR system.

Additionally or alternatively, the request may be provided by the DVR system itself. For example, a user may schedule a recording of a particular media content program for a particular time period (e.g., one or more predetermined time slots) in the future. When it is time for the scheduled recording to begin (or a predetermined amount of time before the scheduled recording is to begin), the DVR system may provide a request to tune to the media content program so that the DVR system may record the media content program.

Conflict resolution management facility 404 may be configured to perform one or more conflict resolution management operations. For example, in response to a request for the DVR system to tune to a media content program at a time during which all of the tuners of the DVR system are tuned to other media content programs, conflict resolution management facility 404 may identify one or more media content programs included in the other media content programs that are being presented by the DVR system at the time of the request and one or more media content programs included in the other media content programs that are only being recorded by the DVR system at the time of the request.

A determination that a media content program is being presented by the DVR system at the time of the request may be indicative that one or more users of the DVR system are watching or otherwise experiencing the media content program at the time of the request. In contrast, a determination that a media content program is only being recorded at the time of the request may indicate that no users of the DVR system are watching the media content program at the time of the request.

To illustrate, with respect to the example provided in FIG. 2, a user located within the family room of premises 204 may provide a request for media content processing device 202-1 to tune to a particular media content program (e.g., so that media content processing device 202-1 may record the particular media content program). The request may be provided at a time during which all of the tuners associated with media content processing devices 202 are already tuned to other media content programs, thus resulting in a conflict. To facilitate resolution of the conflict, conflict resolution management facility 404 may determine which of the media content programs tuned to by media content processing devices 202 are being presented by media content processing devices 202 at the time of the request and which of the media content programs tuned to by media content processing devices 202 are only being recorded by the media content processing devices 202 at the time of the request. For example, conflict resolution management facility 404 may determine that two different media content programs are being presented by media content processing devices 202-3 and 202-4 at the time of the request and that four other media content programs are only being recorded by one or more of content processing devices 202. This determination may indicate that users located within the two bedrooms of premises 204 may be watching or otherwise experiencing the media content programs being presented by media content processing devices 202-3 and 202-4 and that no one within premises 204 is watching or otherwise experiencing the four other media content programs only being recorded by one or more of media content processing devices 202. It will be recognized that, in some examples, any of media content processing devices 202 may also be recording either of the media content programs being presented by media content processing devices 202-3 and 202-4 at the time of the request.

Returning to FIG. 4, conflict resolution management facility 404 may identify one or more media content programs that are being presented by the DVR system at the time of the request by identifying one or more media content programs that are being displayed by way of one or more displays communicatively coupled to the DVR system at the time of the request. Conflict resolution management facility 404 may identify a media content program that is being displayed by way of a display communicatively coupled to the DVR system in any suitable manner. For example, conflict resolution management facility 404 may detect that the display is powered on and receiving a signal from DVR system while a tuner associated with the DVR system is tuned to the media content program.

Additionally or alternatively, conflict resolution management facility 404 may identify a media content program that is being displayed by way of a display communicatively coupled to the DVR system by detecting that a flag (e.g., an electronic bit) associated with the DVR system is on at the time of the request. The flag may be turned on in response to interaction by a user (e.g., a user other than the user who provided the request) with the DVR system. Such interaction by the user with the DVR system may include the user providing an input command representative of a channel change, a program guide launch, a menu launch, a volume change, and/or any other input command that may indicate that the user is actively watching or otherwise experiencing media content by way of the DVR system. In some examples, the flag may be turned off after a predetermined amount of time (e.g., four hours) during which conflict resolution management facility 404 does not detect any interaction by the user with the DVR system.

In some examples, conflict resolution management facility 404 may identify a media content program that is only being recorded by the DVR system at the time of the request by determining that the media content program is being recorded by the DVR system without being displayed by way of one or more displays communicatively coupled to the DVR system. For example, conflict resolution management facility 404 may determine that none of the displays coupled to the DVR system are receiving a signal representative of the media content program while the DVR system is recording the media content program.

Conflict resolution management facility 404 may be further configured to present a conflict resolution interface that includes one or more selectable entries representative of the identified one or more media content programs that are only being recorded by the DVR system at the time of the request. Conflict resolution management facility 404 may be further configured to exclude the identified one or more media content programs that are being presented by the DVR system at the time of the request from being represented in the conflict resolution interface. As will be described below, this may ensure an interrupted viewing experience of users who are watching or otherwise experiencing media content programs by way of the DVR system at the time of the request. Exemplary conflict resolution interfaces will be described in more detail below.

In some alternative embodiments, conflict resolution management facility 404 may alternatively include the media content programs that are being presented by the DVR system at the time of the request in the conflict resolution interface together with an option for the user to watch one of these media content programs (e.g., by way of tuner sharing).

In some examples, conflict resolution management facility 404 may be configured to present the conflict resolution interface exclusively to a user who provided the request. For example, referring again to the example provided above in connection with FIG. 2 in which a user located within the family room of premises 204 provides a request for media content processing device 202-1 to tune to a particular media content program, conflict resolution management facility 404 may present the conflict resolution interface exclusively by way of media content processing device 202-1 and display 206-1 (i.e., without presenting the conflict resolution interface to other users within premises 204 by way of media content processing devices 202-2 through 202-4). In this manner, a viewing experience of the other users may not be interrupted.

Returning to FIG. 4, storage facility 406 may be configured to store conflict data 408 representative of one or more conflicts detected by detection facility 402 and conflict resolution data 410 generated or utilized by conflict resolution management facility 404. Storage facility 406 may maintain additional or alternative data as may serve a particular implementation.

Various conflict resolution interfaces that may be presented by conflict resolution management facility 404 will now be described. It will be recognized that the conflict resolution interfaces described herein are merely illustrative of the many different conflict resolution interfaces that may be presented by conflict resolution management facility 404.

Figure 5:
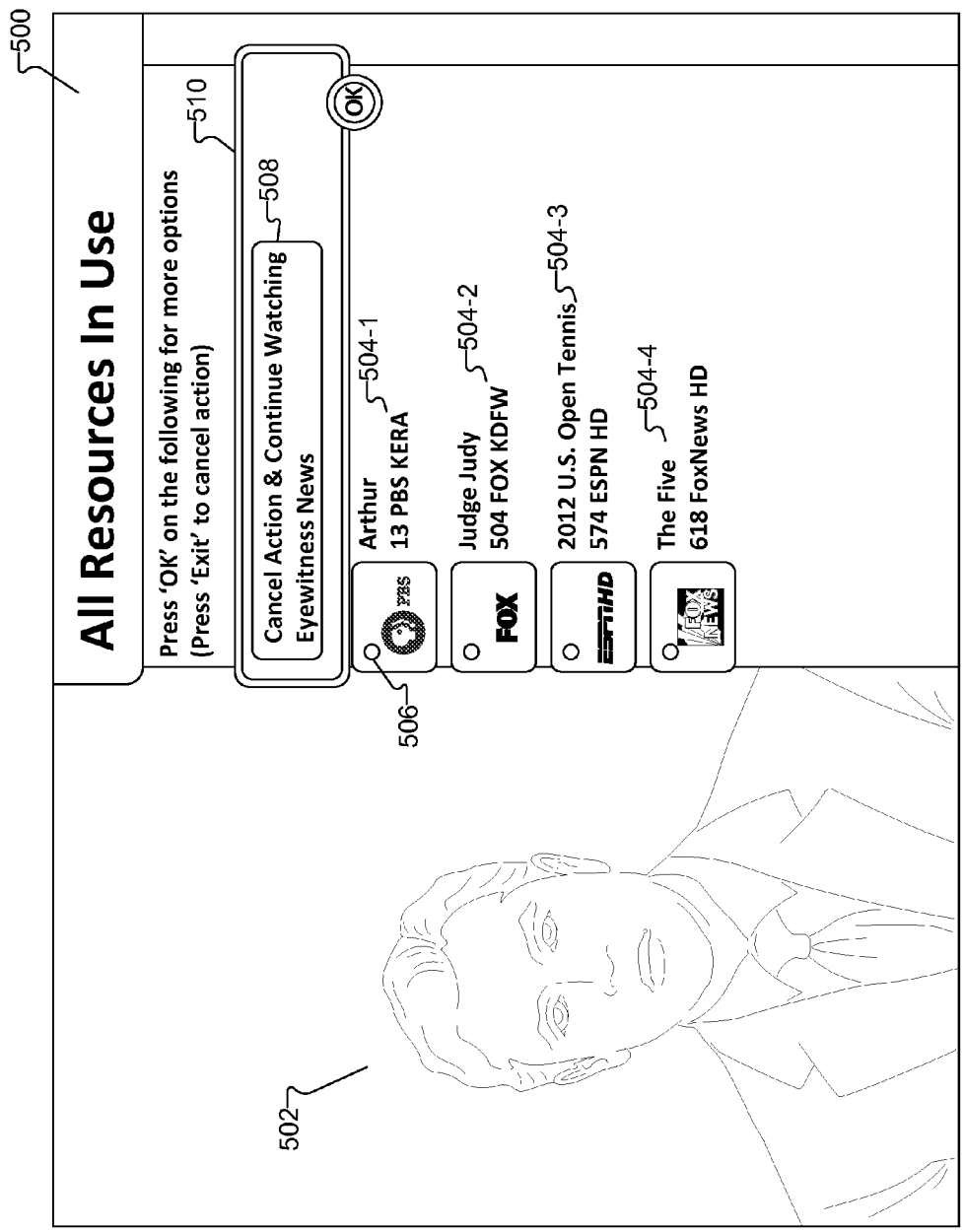
FIGS. 5-8 show exemplary conflict resolution interfaces according to principles described herein.

FIG. 5 shows an exemplary conflict resolution interface 500 that may be presented by conflict resolution management facility 404 in response to a request provided by a user of a DVR system for the DVR system to tune to a media content program at a time during which all of the tuners of the DVR system are tuned to other media content programs. For purposes of this example, the media content program associated with the request (i.e., the "requested media content program") is entitled "Seinfeld." It will also be assumed for purposes of this example that the DVR system has six tuners.

The request may include a request to present the media content program and/or to record the media content program and may be initiated by way of an electronic program guide and/or in any suitable manner while the user is watching another media content program 502 (e.g., a news broadcast) on live television. While in the example of FIG. 5 the user is watching live television at the time of the request, it will be recognized that the user may alternatively be watching on-demand content, pay-per-view content, or any other type of media content at the time of the request. Moreover, it will be recognized that the request may create a conflict if fulfillment of the request would require a tuner in addition to the tuner already tuned to the media content program that the user is watching at the time of the request.

Conflict resolution interface 500 may be presented by conflict resolution management facility 404 in any of the ways described herein. For example, conflict resolution interface 500 may be presented by way of a display (e.g., display 206-1) communicatively coupled to a media content processing device (e.g. media content processing device 202-1) being used by the user. Additionally or alternatively, conflict resolution interface 500 may be presented by way of a separate device not directly coupled to media content processing device 202-1. For example, conflict resolution interface 500 may be presented by way of a mobile device (e.g. a mobile phone or a tablet computer) associated with the user.

In some examples, as shown in FIG. 5, conflict resolution interface 500 may be overlaid on top of a presentation of the media content program 502 that the user is currently watching at the time of the request. Alternatively, conflict resolution interface 500 may be presented as a full-screen interface.

As shown, conflict resolution interface 500 may include a plurality of selectable entries 504 (e.g., entries 504-1 through 504-4) each representative of a particular media content program that is only being recorded by the DVR system at the time of the request. As described previously, conflict resolution management interface 404 may exclude media content programs being presented at the time of the request from being represented within conflict resolution interface 500. In this example, conflict resolution management interface 404 has determined that one media content program is being presented at the time of the request (other than the media content program being watched by the user when the user makes the request). Hence, only four media content programs are represented by entries 504 in conflict resolution interface 500. This signifies that four tuners included in the six-tuner DVR system are being used to only record media content programs, one tuner is being used to present the media content program that the user is watching when the user makes the request, and one tuner is being used to present another media content program to another user of the DVR system.

Each entry 504 may include identifying information associated with its corresponding media content program. For example, as shown in FIG. 5, each entry 504 may include a title of its corresponding media content program, information identifying a media content channel carrying the corresponding media content program, and/or a graphical object (e.g., graphical object 506) indicating a recording status of the media content program.

In some examples, conflict resolution interface 500 may also include an option 508 that may be selected by the user (e.g., by positioning a selection box 510 over option 508 and pressing an "OK" button on a remote control associated with the DVR system) in order to cancel the request and continue watching media content program 502 on live television. If the user selects option 508, conflict resolution management facility 404 may cancel the request, stop presenting conflict resolution interface 500, and direct DVR system to continue presenting media content program 502.

However, if the user selects one of entries 504, conflict resolution management facility 404 may present an option to cancel the recording of the media content program represented by the selected entry and redirect a tuner associated with the recording of the media content program represented by the selected entry to tune to the requested media content program.

Figure 6:
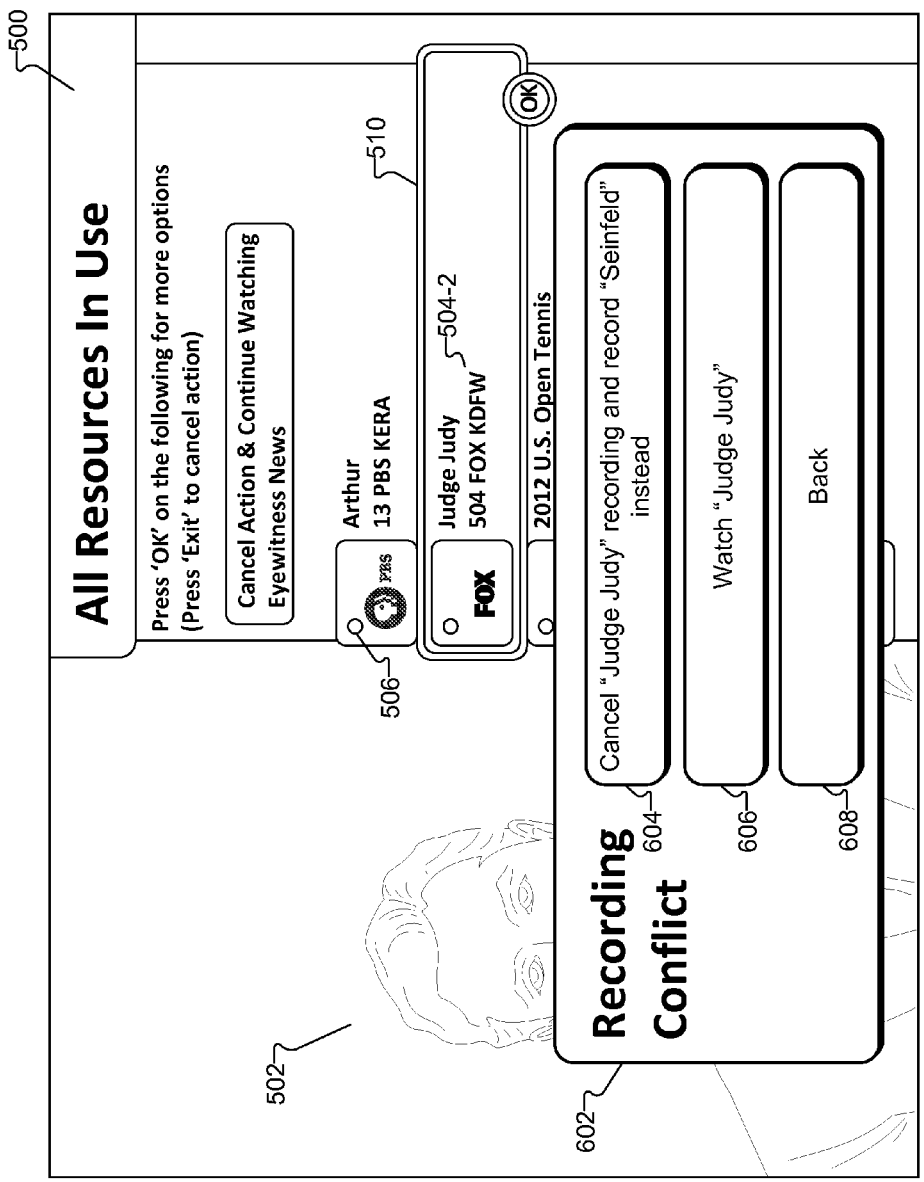

To illustrate, FIG. 6 shows an exemplary pop-up window 602 that may be presented within conflict resolution interface 500 in response a user selection of entry 504-2, which is representative of a media content program being recorded by the DVR system at the time of the request and entitled "Judge Judy."

As shown, pop-up window 602 may include an option 604 to cancel the recording of the media content program entitled "Judge Judy" and to redirect a tuner associated with the recording to tune to the requested media content program (i.e., the media content program entitled "Seinfeld"). In some examples, conflict resolution management facility 404 may detect a selection by the user of option 604 and, in response, direct the DVR system to tune to the requested media content program using the tuner that had been used to record the media content program entitled "Judge Judy."

Pop-up window 602 may also include an option 606 to experience (e.g., watch) the media content program entitled "Judge Judy" by sharing the tuner being used to record the media content program entitled "Judge Judy." Option 606 may be selected by the user if the user decides that he or she would like to watch or otherwise experience one of the media content programs being recorded by the DVR system instead of viewing and/or recording the requested media content program. Conflict resolution management facility 404 may detect a selection by the user of option 606 and, in response, direct the DVR system to present the media content program entitled "Judge Judy" to the user by sharing the tuner being used to record the media content program entitled "Judge Judy."

Pop-up window 602 may also include an option 608 that may be selected by the user to close pop-up window 602 and return to the list of entries 504 presented within conflict resolution interface 500. Option 608 may be selected when the user desires to view one or more options associated with a different media content program represented in conflict resolution interface 500.

In some examples, as mentioned previously, conflict resolution management facility 404 may alternatively include the media content program that is being presented by the DVR system to another user of the DVR system at the time of the request in the conflict resolution interface. However, conflict resolution management facility 404 may provide only an option for the user to experience (e.g., watch) the media content program by sharing the tuner being used to present the media content program to the other user. In this manner, the tuner being used to present the media content program to the other user may not be reallocated to the media content program originally requested by the user, thereby preserving the viewing experience of the other user.

Figure 7:
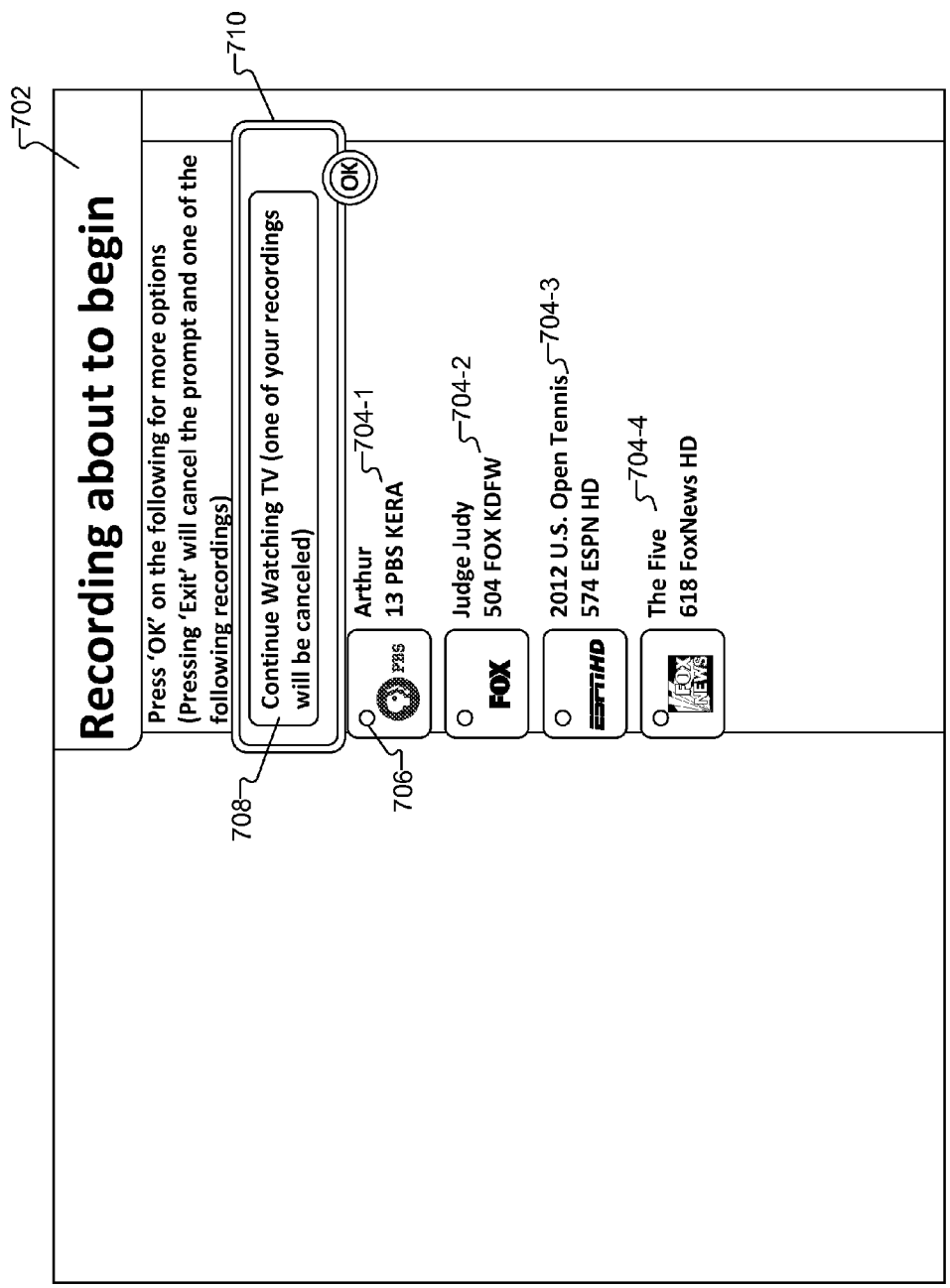

FIG. 7 shows an exemplary conflict resolution interface 702 that may be presented by conflict resolution management facility 404 in response to a request provided by the DVR system for the DVR system to tune to a media content program at a time during which all of the tuners of the DVR system are tuned to other media content programs.

For purposes of this example, the media content program associated with the request (i.e., the "requested media content program") is a media content program that has been scheduled to be recorded by a user of the DVR system and is entitled "The Simpsons." Moreover, for purposes of this example, it will be assumed that the user of the DVR system is watching or otherwise experiencing a media content program (e.g., a live television program, an on-demand media content program, and/or a pay-per-view media content program) at the time of the request (i.e., at or immediately before a time that the recording is scheduled to begin) and that the DVR system has six tuners.

Conflict resolution interface 702 may be presented by conflict resolution management facility 404 in any of the ways described herein. For example, conflict resolution interface 702 may be presented by way of a display (e.g., display 206-1) communicatively coupled to a media content processing device (e.g. media content processing device 202-1) being used by the user. Additionally or alternatively, conflict resolution interface 702 may be presented by way of a separate device not directly coupled to media content processing device 202-1. For example, conflict resolution interface 702 may be presented by way of a mobile device (e.g. a mobile phone or a tablet computer) associated with the user. In some examples, conflict resolution interface 702 may be presented by way of each media content processing device (e.g., each media content processing device 202) that implements the DVR system. In this manner, the user may interact with conflict resolution interface 702 regardless of the particular media content processing device that the user is using at the time of the request.

As shown, conflict resolution interface 702 may include a plurality of selectable entries 704 (e.g., entries 704-1 through 704-4) each representative of a particular media content program that is only being recorded by the DVR system at the time of the request. As described previously, conflict resolution management interface 404 may exclude media content programs being presented at the time of the request from being represented within conflict resolution interface 702. In this example, conflict resolution management interface 404 has determined that one media content program is being presented at the time of the request (other than the media content program being watched by the user when the user makes the request). Hence, only four media content programs are represented by entries 704 in conflict resolution interface 700. This signifies that four tuners included in the six-tuner DVR system are being used to only record media content programs, one tuner is being used to present the media content program that the user is watching when the user makes the request, and one tuner is being used to present another media content program to another user of the DVR system.

Each entry 704 may include identifying information associated with its corresponding media content program. For example, as shown in FIG. 7, each entry 704 may include a title of its corresponding media content program, information identifying a media content channel carrying the corresponding media content program, and/or a graphical object (e.g., graphical object 706) indicating a recording status of the media content program.

In some examples, conflict resolution interface 702 may also include an option 708 that may be selected by the user (e.g., by positioning a selection box 710 over option 708 and pressing an "OK" button on a remote control associated with the DVR system) in order to continue watching media content program 702 on live television. If the user selects option 708, conflict resolution management facility 404 may cancel one of the recordings being performed by the DVR system, direct the DVR system to begin recording the requested media content program, and direct the DVR system to continue presenting the media content program being presented at the time of the request. Conflict resolution management facility 404 may select the recording that is to be canceled in any suitable manner. For example, conflict resolution management facility 404 may select the recording that is to be canceled in accordance with one or more preferences of the user, one or more predefined rules as specified by the user, and/or any other suitable manner. Alternatively, conflict resolution management facility 404 may allow the user to manually select a particular recording for cancellation.

In some examples, if the user selects one of entries 704, conflict resolution management facility 404 may present an option to cancel the recording of the media content program represented by the selected entry and redirect a tuner associated with the recording of the media content program represented by the selected entry to tune to the requested media content program (i.e., begin recording the requested media content program).

Figure 8:
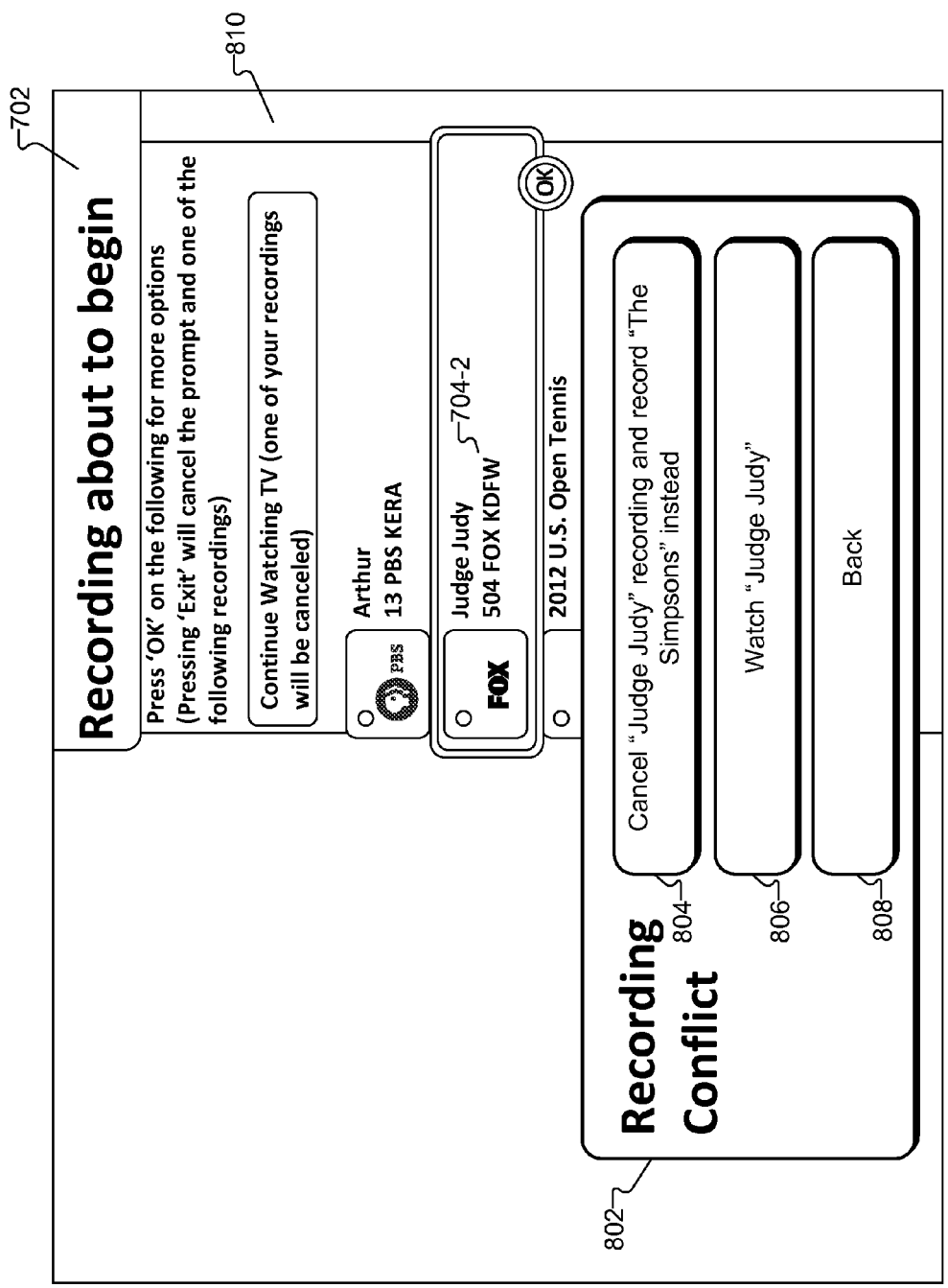

To illustrate, FIG. 8 shows an exemplary pop-up window 802 that may be presented within conflict resolution interface 702 in response a user selection of entry 704-2, which is representative of a media content program being recorded by the DVR system at the time of the request and entitled "Judge Judy."

As shown, pop-up window 802 may include an option 804 to cancel the recording of the media content program entitled "Judge Judy" and to redirect a tuner associated with the recording to tune to the requested media content program (i.e., the media content program entitled "The Simpsons"). In some examples, conflict resolution management facility 404 may detect a selection by the user of option 804 and, in response, direct the DVR system to begin recording the requested media content program using the tuner that had been used to record the media content program entitled "Judge Judy."

Pop-up window 802 may also include an option 806 to experience (e.g., watch) the media content program entitled "Judge Judy" by sharing the tuner being used to record the media content program entitled "Judge Judy." Option 806 may be selected by the user if the user decides that he or she would like to watch or otherwise experience one of the media content programs being recorded by the DVR system instead of recording the requested media content program. Conflict resolution management facility 404 may detect a selection by the user of option 806 and, in response, direct the DVR system to present the media content program entitled "Judge Judy" to the user by sharing the tuner being used to record the media content program entitled "Judge Judy." In this case, it will be assumed that the media content program being watched by the user at the time of the request is also being watched by another user of the DVR system in a different room (e.g., using tuner sharing). Hence, the tuner allocated to this media content program would remain allocated to the media content program, thereby necessitating the cancellation of the request to record the media content program entitled "The Simpsons." If, on the other hand, no other user is experiencing the media content program to which the tuner is allocated at the time of the request and the user decides to begin watching "Judge Judy" instead, the tuner may be reallocated to the recording of the media content program entitled "The Simpsons."

Pop-up window 802 may also include an option 808 that may be selected by the user to close pop-up window 802 and return to the list of entries 704 presented within conflict resolution interface 702. Option 808 may be selected when the user desires to view one or more options associated with a different media content program represented in conflict resolution interface 702.

In some examples, the request initiated by the DVR system may occur at a time during which no user is actively interacting with the DVR system. For example, the request may occur at a time during which no user is viewing media content by way of the DVR system. In this case, conflict resolution interface 702 may not be viewed by any user of the DVR system. Hence, in some examples, after the conflict resolution interface 702 has been presented for a predetermined amount of time without being interacted with by a user, conflict resolution management facility 404 may be configured to automatically cancel one of the media content programs already being recorded and to begin recording the requested media content program.

In some examples, conflict resolution system 400 (i.e. conflict resolution management facility 404) may be configured to detect a request provided by a user for the DVR system to record a media content program during a future time period that is at least one time slot (e.g., a predefined time period, such as a fifteen minute time period) subsequent to the time of the request. If conflict resolution system 400 determines that all of the tuners are scheduled to be tuned to other media content programs during the future time period, conflict management system 400 may present a conflict resolution interface that includes a plurality of selectable entries representative of the group of other media content programs. The conflict resolution interface may be similar to those described above. The user may utilize the conflict resolution interface to cancel a scheduled recording of one of the media content programs represented in the conflict resolution interface and replace that scheduled recording with a scheduled recording of the media content program associated with the request.

Figure 9:
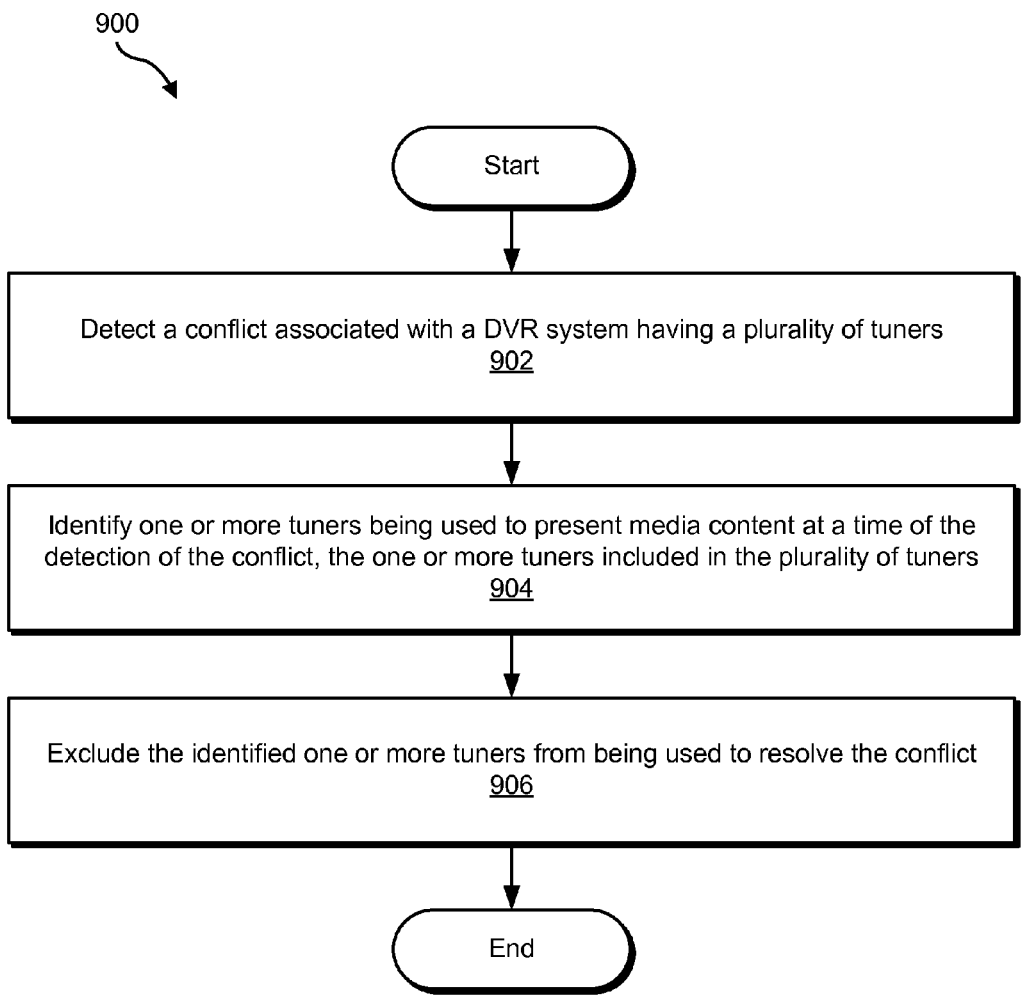
FIG. 9 illustrates an exemplary method of resolving conflicts in a multi-tuner DVR system according to principles described herein.

FIG. 9 illustrates an exemplary method 900 of resolving conflicts in a multi-tuner DVR system. While FIG. 9 illustrates exemplary steps according to one embodiment, other embodiments may omit, add to, reorder, and/or modify any of the steps shown in FIG. 9. One or more of the steps shown in FIG. 9 may be performed by conflict resolution system 400 and/or any implementation thereof.

In step 902, a conflict resolution system detects a conflict associated with a DVR system having a plurality of tuners (i.e., a multi-tuner DVR system). Step 902 may be performed in any of the ways described herein.

In step 904, the conflict resolution system identifies one or more tuners being used to present media content at a time of the detection of the conflict. Step 904 may be performed in any of the ways described herein.

In step 906, the conflict resolution system excludes the identified one or more tuners from being used to resolve the conflict. Step 906 may be performed in any of the ways described herein.

Figure 10:
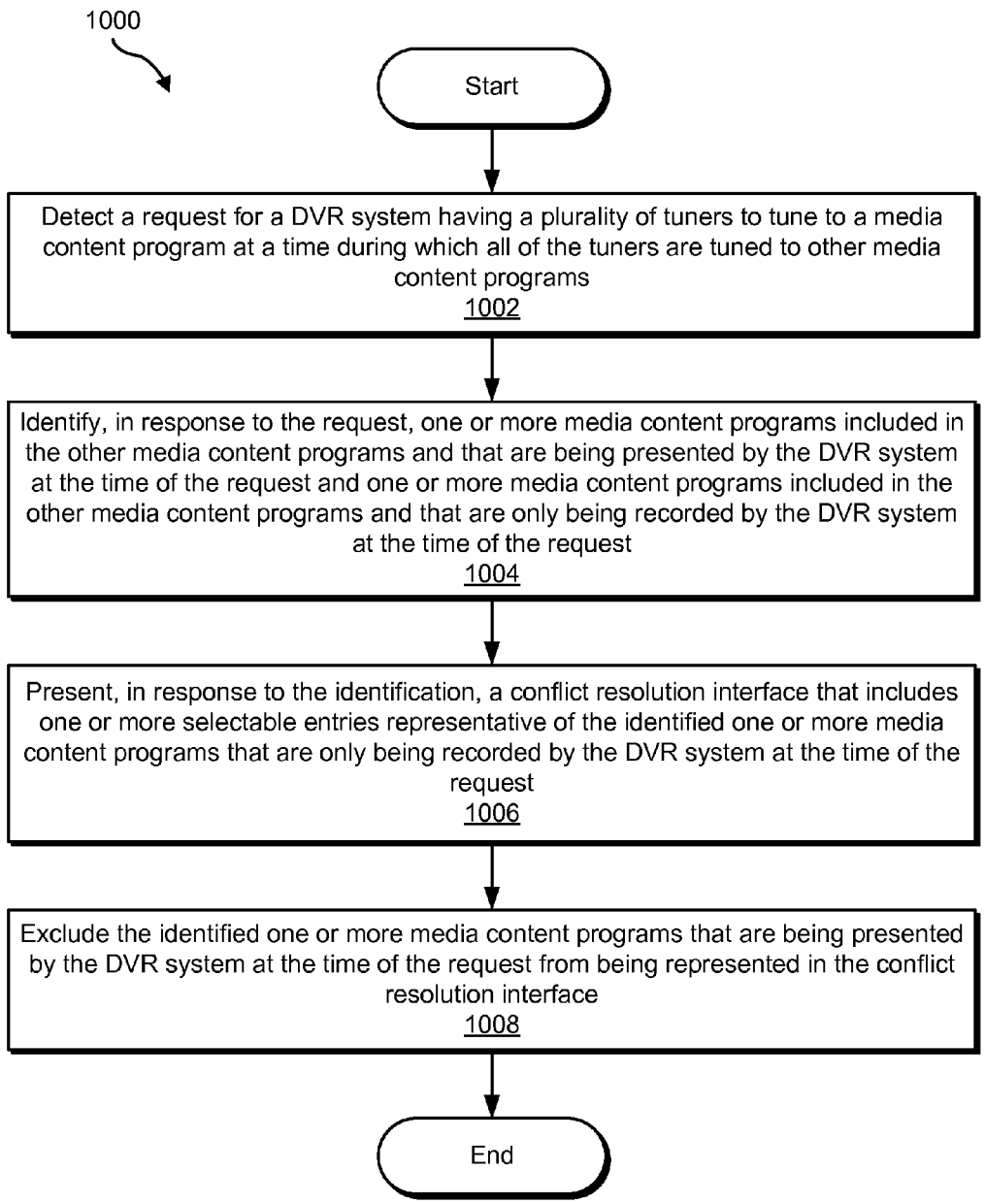
FIG. 10 illustrates an exemplary method of resolving conflicts in a multi-tuner DVR system according to principles described herein.

FIG. 10 illustrates another exemplary method 1000 of resolving conflicts in a multi-tuner DVR system. While FIG. 10 illustrates exemplary steps according to one embodiment, other embodiments may omit, add to, reorder, and/or modify any of the steps shown in FIG. 10. One or more of the steps shown in FIG. 10 may be performed by conflict resolution system 400 and/or any implementation thereof.

In step 1002, a conflict resolution system detects a request for a DVR system having a plurality of tuners (i.e., a multi-tuner DVR system) to tune to a media content program at a time during which all of the tuners are tuned to other media content programs. Step 1002 may be performed in any of the ways described herein.

In step 1004, the conflict resolution system identifies, in response to the request, one or more media content programs included in the other media content programs and that are being presented by the DVR system at the time of the request and one or more media content programs included in the other media content programs and that are only being recorded by the DVR system at the time of the request. Step 1004 may be performed in any of the ways described herein.

In step 1006, the conflict resolution system presents, in response to the identification, a conflict resolution interface that includes one or more selectable entries representative of the identified one or more media content programs that are only being recorded by the DVR system at the time of the request. Step 1006 may be performed in any of the ways described herein.

In step 1008, the conflict resolution system excludes the identified one or more media content programs that are being presented by the DVR system at the time of the request from being represented in the conflict resolution interface. Step 1008 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
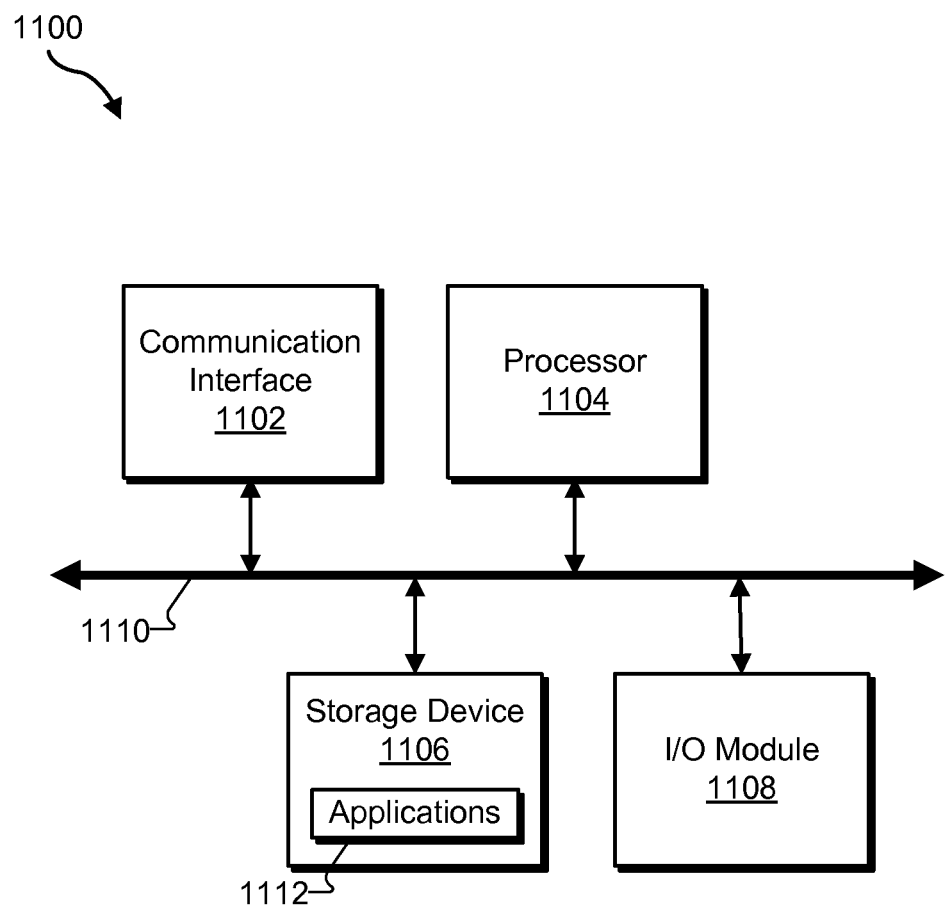
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with detection facility 402 and/or conflict resolution management facility 404. Likewise, storage facility 406 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a conflict resolution system, a request for a digital video recording ("DVR") system having a plurality of tuners to tune to a media content program at a time during which all of the tuners are tuned to other media content programs;
   identifying, by the conflict resolution system in response to the request, one or more media content programs included in the other media content programs and that are being displayed by way of one or more displays communicatively coupled to the DVR system at the time of the request, and one or more media content programs included in the other media content programs and that are only being recorded by the DVR system without being displayed by way of the one or more displays communicatively coupled to the DVR system at the time of the request;
   presenting, by the conflict resolution system in response to the identifying, a conflict resolution interface that includes one or more selectable entries representative of the identified one or more media content programs that are only being recorded by the DVR system without being displayed by way of the one or more displays communicatively coupled to the DVR system at the time of the request, wherein the identified one or more media content programs that are only being recorded by the DVR system are tuned to at the time of the request by a first set of one more tuners included in the plurality of tuners; and
   excluding, by the conflict resolution system, the identified one or more media content programs that are being displayed by way of the one or more displays communicatively coupled to the DVR system at the time of the request from being represented in the conflict resolution interface, wherein the one or more media content programs that are being displayed by way of the one or more displays communicatively coupled to the DVR system are tuned to at the time of the request by a second set of one more tuners included in the plurality of tuners.

2. The method of claim 1, further comprising:
   detecting, by the conflict resolution system, a selection by a user of an entry representative of a particular media content program included in the identified one or more media content programs that are only being recorded by the DVR system without being displayed by way of the one or more displays communicatively coupled to the DVR system at the time of the request; and
   presenting, by the conflict resolution system in response to the selection, an option to cancel the recording of the particular media content program by the DVR system and redirect a tuner associated with the recording of the particular media content program and included in the plurality of tuners to tune to the media content program associated with the request.

3. The method of claim 2, further comprising:
   detecting, by the conflict resolution system, a selection by the user of the option to cancel the recording of the particular media content program by the DVR system; and
   directing, by the conflict resolution system, the DVR system to tune to the media content program associated with the request using the tuner associated with the recording of the particular media content program.

4. The method of claim 1, further comprising:
   detecting, by the conflict resolution system, a selection by a user of an entry representative of a particular media content program included in the identified one or more media content programs that are only being recorded by the DVR system without being displayed, by way of the one or more displays communicatively coupled to the DVR system, at the time of the request; and
   presenting, by the conflict resolution system in response to the selection, an option to experience the particular media content program included in the identified one or more media content programs that are only being recorded by the DVR system without being displayed by way of the one or more displays communicatively coupled to the DVR system at the time of the request.

5. The method of claim 4, further comprising:

detecting, by the conflict resolution system, a selection by the user of the option to experience the particular media content program; and directing, by the conflict resolution system, the DVR system to present the particular media content program to the user by sharing a tuner being used to record the particular media content program.

6. The method of claim 1, wherein the request comprises at least one of a request to present the media content program and a request to record the media content program.

7. The method of claim 1, wherein the request is provided by a user of the DVR system.

8. The method of claim 1, wherein the request is provided by the DVR system.

9. The method of claim 8, wherein the request provided by the DVR system comprises a scheduled recording of the media content program.

10. The method of claim 1, wherein:

the request is provided by a user;

the one or more media content programs being displayed by way of the one or more displays communicatively coupled to the DVR system at the time of the request are being displayed to one or more other users; and the presenting of the conflict resolution interface comprises presenting the conflict resolution interface to only the user without presenting the conflict resolution interface to the one or more other users.

11. The method of claim 1, wherein an entry included in the one or more selectable entries includes at least one of a title of a particular media content program included in the identified one or more media content programs that are only being recorded by the DVR system without being displayed by way of the one or more displays communicatively coupled to the DVR system at the time of the request and information representative of a media content channel carrying the particular media content program.

12. The method of claim 1, wherein at least one media content program included in the one or more media content programs that are being displayed by way of one or more displays communicatively coupled to the DVR system at the time of the request is also being recorded at the time of the request.

13. The method of claim 1, further comprising:

detecting, by the conflict resolution system, an additional request provided by a user for the DVR system to record an additional media content program during a future time period that is at least one time slot subsequent to the time of the additional request;

determining, by the conflict resolution system, that all of the tuners are scheduled to be tuned to a group of other media content programs during the future time period; and presenting, by the conflict resolution system in response to the determining, an additional conflict resolution interface that includes a plurality of selectable entries representative of the group of other media content programs.

14. The method of claim 1, embodied as computer-executable instructions on at least one non-transitory computer-readable medium.

15. A system comprising:

a detection facility configured to detect a request for a digital video recording ("DVR") system having a plurality of tuners to tune to a media content program at a time during which all of the tuners are tuned to other media content programs; and a conflict resolution management facility communicatively coupled to the detection facility and configured to identify, in response to the request, one or more media content programs included in the other media content programs and that are being displayed by way of one or more displays communicatively coupled to the DVR system at the time of the request and one or more media content programs included in the other media content programs and that are only being recorded by the DVR system without being displayed by way of one or more displays communicatively coupled to the DVR system at the time of the request, present, in response to the identification, a conflict resolution interface that includes one or more selectable entries representative of the identified one or more media content programs that are only being recorded by the DVR system without being displayed by way of one or more displays communicatively coupled to the DVR system at the time of the request, wherein the identified one or more media content programs that are only being recorded by the DVR system are tuned to at the time of the request by a first set of one more tuners included in the plurality of tuners, and exclude the identified one or more media content programs that are being displayed by way of one or more displays communicatively coupled to the DVR system at the time of the request from being represented in the conflict resolution interface, wherein the one or more media content programs that are being displayed by way of the one or more displays communicatively coupled to the DVR system are tuned to at the time of the request by a second set of one more tuners included in the plurality of tuners.

* * * * *